United States Patent [19]
Masui et al.

[11] Patent Number: 4,937,507
[45] Date of Patent: Jun. 26, 1990

[54] REGENERATIVE CONTROL SYSTEM FOR MOTOR GENERATOR

[75] Inventors: Hisayuki Masui; Toshiaki Matsuura, both of Kobe; Ryuichi Simada; Tatsuya Matsukawa, both of Tokai, all of Japan

[73] Assignee: Mitsubishi Denki Kabushiki Kaisha, Tokyo, Japan

[21] Appl. No.: 367,291

[22] Filed: Jun. 16, 1989

[30] Foreign Application Priority Data

Jun. 17, 1988 [JP] Japan .................................. 63-149379

[51] Int. Cl.$^5$ .......................................... H02M 5/257
[52] U.S. Cl. ..................................... 318/141; 318/150
[58] Field of Search ................................. 318/140–161

[56] References Cited

U.S. PATENT DOCUMENTS

| | | | |
|---|---|---|---|
| 3,590,350 | 6/1971 | Munson | 318/144 |
| 3,667,012 | 5/1972 | Kilgore | 318/161 |
| 3,688,874 | 9/1972 | Lusti et al. | 318/145 X |
| 4,495,451 | 1/1985 | Barnard | 318/150 |
| 4,498,551 | 2/1985 | Arbisi | 318/144 X |
| 4,621,222 | 11/1986 | Kahkipuro et al. | 318/146 |
| 4,652,989 | 3/1987 | Kurosawa et al. | 318/161 |
| 4,684,854 | 8/1987 | Sankey | 318/140 |

OTHER PUBLICATIONS

"Static Converter Starting of Large Synchronous Motors", IAS. 76. Annual Meeting IEEE, pp. 18–25.

*Primary Examiner*—Bentsu Ro
*Attorney, Agent, or Firm*—Sughrue, Mion, Zinn, Macpeak and Seas

[57] ABSTRACT

A generator driving apparatus is provided with a thyristor driving device for driving a motor-generator, and the thyristor driving device always controls the driving of the motor-generator regardless of the number of rotations thereof. Also, when the motor-generator is coming to a stop, energy conserved in the motor-generator is regenerated to an electric power system through the thyristor driving device.

5 Claims, 2 Drawing Sheets

REGENERATIVE CONTROL SYSTEM FOR MOTOR GENERATOR

BACKGROUND OF THE INVENTION

1. Field of the Invention

The present invention relates to a generator driving apparatus for driving a motor-generator, and more particularly to a generator driving apparatus which can regenerate energy stored by the motor-generator to an electric power system when the motor-generator is coming to a stop.

2. Description of Related Art

FIG. 1 is a circuit diagram showing a conventional generator driving apparatus for driving a flywheel generator, in which P designates an electric power system for supplying 3-phase electric power, and reference numerals 1a, 1b, 1c and 1d designate switches. The electric power system P is connected with an induction motor 2 through the switch 1d, and a motor-generator 3 is connected to the induction motor 2 driven by a Sherbius system 8 to be discussed below.

A flywheel 4 rotatable together with the motor-generator 3 is connected thereto and an exciter 5 is magnetically connected therewith, the motor-generator 3, flywheel 4 and exciter 5, comprising the flywheel generator. Furthermore, an intermittent load 6 is connected to the motor-generator 3.

A liquid resistor 7 is connected to the induction motor 2 through the switch 1c, which comprises a resistor for generating Joule heat and a liquid for cooling the resistor, the induction motor 2 being provided with a rotation detector (not shown).

The Sherbius system 8 is connected with the electric power system P through the switch 1a, has a rectifier transformer 8a connected to the switch 1a at the primary windings thereof, a thyristor rectifier 8b connected to the secondary windings of the rectifier transformer 8a and a diode rectifier 8d connected in inverse-parallel thereto through a DC circuit breaker 8c, and is connected to the induction motor 2 through the switch 1b. The Sherbius system 8, induction motor 2 and liquid resistor 7, comprise a driving apparatus for controlling the number of rotations of the motor-generator 3.

Next, an explanation will be given of the operation of the generator driving apparatus shown in FIG. 1. The driving of the motor-generator 3 is controlled by the induction motor 2 and liquid resistor 7 in a range from zero to the lowest usable number of rotations, and by the Sherbius system 8 and induction motor 2 in a range from the lowest to the highest usable number of rotations.

When the motor-generator 3 is started, in the range from zero to the lowest usable number of rotations thereof, the switch 1d is closed and switches 1a, 1b and 1c are open, so that the electric power system P supplies electric power to the induction motor 2 so as to drive the induction motor 2 and the motor-generator 3 is accelerated thereby. Thereafter, the switches 1a and 1b are closed and switches 1c and 1d are opened to switch the driving control until the number of rotations of the motor-generator 3 reaches its rated value (under the maximum number of rotations). The electric power system P supplies the electric power to the induction motor 2 through the Sherbius system 8 so as to drive the induction motor 2 so that the motor-generator 3 is accelerated by the Sherbius system 8 and induction motor 2.

The motor-generator 3 driven at its rated number of rotations under the control of the Sherbius system 8 feeds electric power to the intermittent load 6, which consumes energy to lower the number of rotations of the motor-generator 3 and the induction motor 2 coaxially connected thereto. When the rotation detector (not shown) detects a reduction in the number of rotations of the induction motor 2, the Sherbius system 8 accelerates the induction motor 2 while no electric power is fed to the intermittent load 6, thereby returning the number of rotations of the induction motor 2 to a desired rated number of rotations.

When the motor-generator 3 is stopped, the Sherbius system 8 and induction motor 2 are used to decelerate the motor-generator 3 until the number of rotations thereof reaches the lowest usable number of rotations. When this point is reached, the switch 1b is opened and switch 1c is closed so as to switch driving control by the Sherbius system 8 to the liquid resistor 7. Energy stored by the rotation of the motor-generator 3 and flywheel 4 is consumed as Joule heat by the liquid resistor 7, the motor-generator 3 continuing speed reduction to stop at last.

The conventional generator driving apparatus, as above-mentioned, comprises the Sherbius system 8, liquid resistor 7 and induction motor 2. Accordingly, when the driving of the motor-generator 3 is controlled, a problem is created in that the control must be executed by switching the Sherbius system 8 and liquid resistor 7. Also, when the motor-generator 3 is decelerated to a stop, since the stored energy is consumed by the liquid resistor 7, an electric power loss occurs.

SUMMARY OF THE INVENTION

In order to solve the above problems, the present invention has been designed. The generator driving apparatus of the invention is provided with a thyristor driving device. The thyristor driving device controls the driving of the motor-generator until the number of rotations reaches the maximum number from zero (starting condition). Also, when the motor-generator is coming to a stop, the energy conserved therein is regenerated to an electric power system.

An object of the invention is to provide a generator driving apparatus which can control the driving of the motor-generator without any switching.

Another object of the invention is to provide a generator driving apparatus which can regenerate to the electric power system the energy conserved when the motor-generator is coming to a stop, thereby preventing useless power loss.

Still another object of the invention is to provide a generator driving apparatus requiring induction motor or liquid resistor.

A further object of the invention is to provide a generator driving apparatus which is provided with a flywheel rotatable together with the motor-generator, thereby increasing the stored energy to be regenerated to the electric power system.

The above and further objects and features of the invention will more fully be apparent from the following detailed description with accompanying drawings.

DESCRIPTION OF THE PREFERRED EMBODIMENTS

Figure 1:
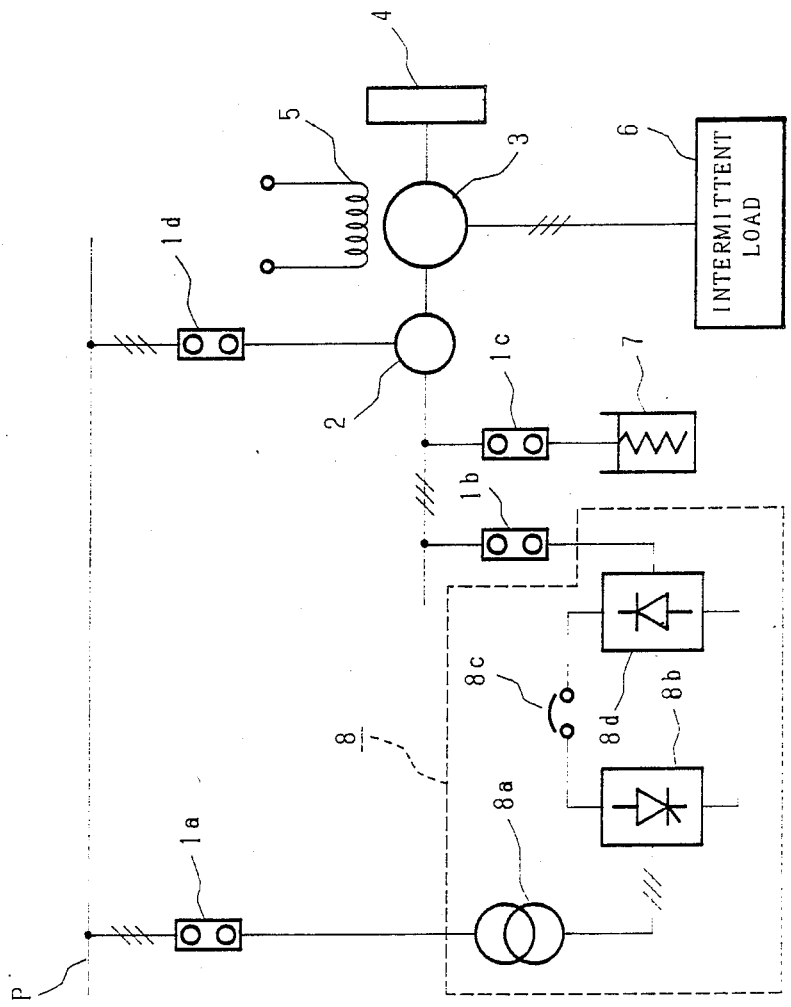
FIG. 1 is a circuit diagram showing the conventional generator driving apparatus.
Figure 2:
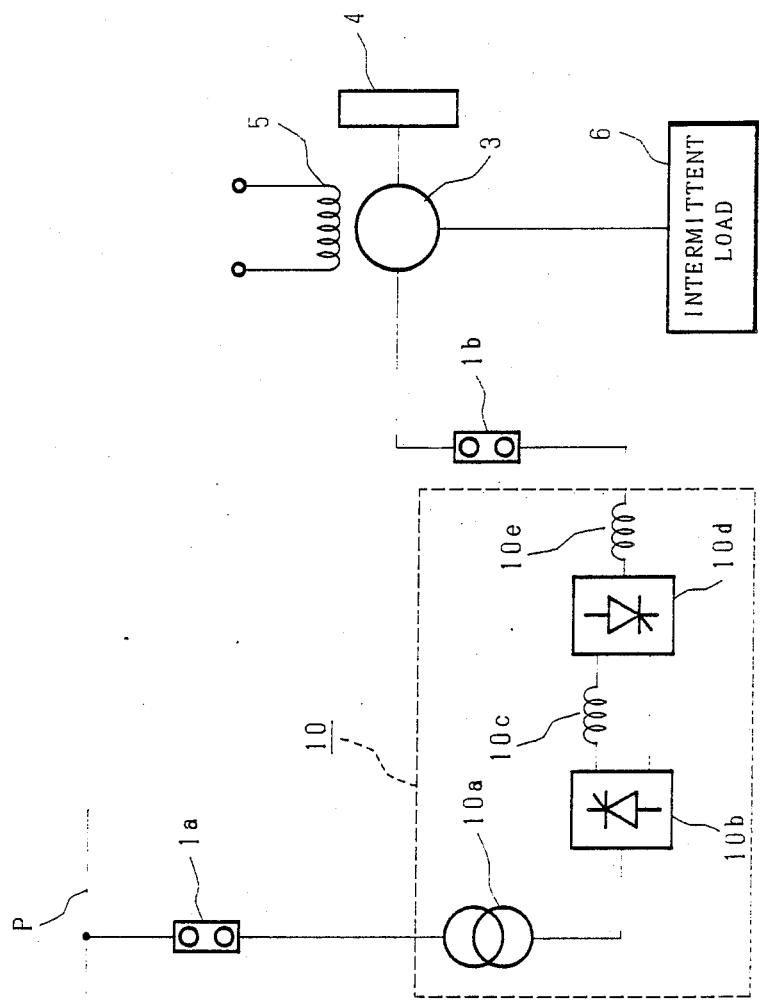
FIG. 2 is a circuit diagram showing a generator driving apparatus of the invention.

Next, an embodiment of a generator driving apparatus of the invention will be described. In FIG. 2, the reference numerals used in FIG. 1 designate like components. Namely, P designates an electric power system, 1a and 1b designate switches, 3 designates a motor-generator, 4 designates a flywheel, 5 designates an exciter and 6 designates an intermittent load.

In FIG. 2, reference numeral 10 designates a thyristor driving device for controlling the number of rotations of the motor-generator 3. The thyristor driving device 10 comprises a rectifier transformer 10a connected at its primary windings to the switch 1a, a normal conversion thyristor converter (to be hereinafter called the converter) 10b connected to the secondary windings of the transformer 10a, a DC reactor 10c, an inverse conversion thyristor converter (to be hereinafter called the inverter) 10d connected in inverse-parallel to the converter 10b through the DC reactor 10c, and an AC reactor 10e connected to the inverter 10d. The DC reactor 10c is interposed between the cathode of converter 10b and the anode of inverter 10d, the anode of converter 10b and cathode of inverter 10d being directly connected. The AC reactor 10e serving as an output terminal of the thyristor driving device 10 is connected to the motor-generator 3 through the switch 1b.

In operation, the switches 1a and 1b are normally closed, an the driving of the motor-generator 3 is controlled by the thyristor driving device 10 regardless of the number of rotations.

When the motor-generator 3 starts, electric power supplied from the electric power system P through the thyristor driving device 10 accelerates the motor-generator 3 up to the rated number of rotations, at which time the control terminals of the converter 10b and inverter 10d are so controlled that the anode side of converter 10b and cathode side of inverter 10d are kept at a negative potential and the cathode side of converter 10b is slightly higher in potential than the anode side of inverter 10d. Accordingly, the electric power from the electric power system P is supplied to the motor-generator 3 through the rectifier transformer 10a, converter 10b, DC reactor 10c, inverter 10d and AC reactor 10e.

When the number of rotations of the motor-generator 3 is reduced due to feed therefrom to the intermittent load 6, as in the conventional example, the motor-generator 3 is accelerated while no electric power is fed to the intermittent load 6, thereby being restored to the rated number of rotations.

For stopping the motor-generator 3, the control terminals of the converter 10b and inverter 10d are switched, and controlled to keep the cathode side of converter 10b and anode side of inverter 10d at a negative potential while making the potential at the cathode side of inverter 10d slightly higher than that at the anode side of converter 10b. Accordingly, the stored rotational energy of the motor-generator 3 and flywheel 4 is regenerated to the electric power system P through the AC reactor 10e, inverter 10d, DC reactor 10c, converter 10b and rectifier transformer 10a.

Thus, the motor-generator 3 is subjected to regenerative braking so that the stored energy is fed to other loads (not shown) through the electric power system P without being wastefully consumed.

In addition, in this embodiment, the flywheel generator provided with the flywheel is exemplary, but the present invention may be applied to a usual motor-generator having no flywheel. In this case, the stored energy is reduced to that extent of the rotary energy of flywheel, but the same effect of course is attainable. Also, it is considered to apply the present invention to other rotation speed control.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A generator driving apparatus for driving a motor-generator (3) connected to an electric power system (P), comprising: a thyristor driving device (10) for controlling the driving of said motor-generator and for regenerating energy stored in said motor-generator to said electric power system when said motor-generator is coming to a stop, wherein said thyristor driving device includes a rectifier transformer (10a) connected to said electric power system, a normal conversion thyristor converter (10b) connected to said rectifier transformer, an inverse conversion thyristor converter (10d) connected in inverse-parallel to said normal conversion thyristor converter, a DC reactor (10c) interposed between said normal conversion thyristor converter and said inverse conversion thyristor converter, and circuit means establishing a connection between said inverse conversion thyristor converter and the motor-generator.

2. A generator driving apparatus according to claim 1, wherein said thyristor driving device is provided in a connection line for said electric power system and said motor-generator.

3. A generator driving apparatus according to claim 1, wherein said motor-generator is provided with a flywheel rotatable together therewith.

4. A generator driving apparatus according to claim 3, wherein said motor-generator is magnetically connected with an exciter.

5. A generator driving apparatus according to claim 1, wherein said circuit means includes an AC reactor (10e).

* * * * *